Nov. 1, 1955
H. ODEN
2,722,568
CONDENSER ARRANGEMENT FOR REGISTERING AND SENDING CONTROL SIGNALS
Filed Oct. 22, 1952
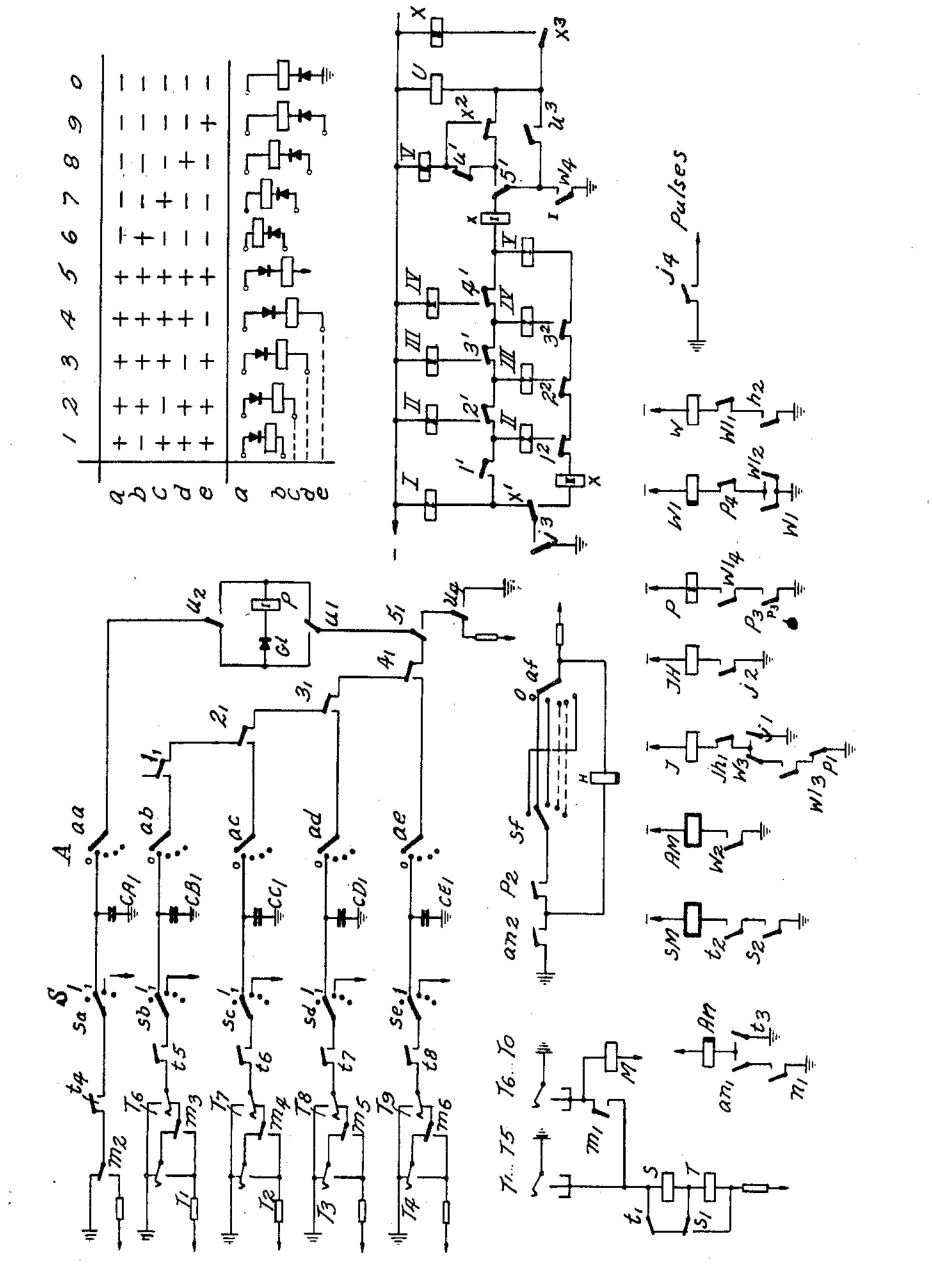
INVENTOR
HOECKLEY ODEN
BY Robert Harding Jr.
ATTORNEY 2,722,568

CONDENSER ARRANGEMENT FOR REGISTERING AND SENDING CONTROL SIGNALS

Hoeckley Oden, Stuttgart/Stammheim, Germany, assignor to International Standard Electric Corporation, New York, N. Y., a corporation of Delaware Application October 22, 1952, Serial No. 316,279

Claims priority, application Germany November 2, 1951

3 Claims. (Cl. 179—18)

The present invention relates to an arrangement for registering and transmitting the signals necessary for the control of selection stages in automatic telecommunication systems by using condensers as storing elements, whereby the charge of the condensers determines the registered signals. The application of such arrangements is regarded specially suitable for key sets in telephone installations.

Key senders are already known, using condensers as storing elements. Generally the condensers are charged by the current via the selecting key. Two types are known in such arrangements; in the corresponding first case the degree of the condenser's charge represents the signal; in the second case the charges of a number of condensers are used for representing the signal.

The first-mentioned embodiment has the advantage of requiring a relatively small number of storing condensers, but on the other hand there is the drawback of it being unable to master the evaluation of the signal with simple means in a well defined manner. This drawback is excluded in the second embodiment, but in place thereof a greater number of storing elements will be required.

The present invention employs an arrangement for the purpose of storing the individual control signals. These signals are divided into groups according to their values and the storing features of the groups are constituted by discriminating potentials and, within the groups, by different combinations of charged and not charged condensers. The groups are constituted in such a manner, that the digits 1–5 are assigned to the first group and the digits 6–0 to the second group. To enable a discrimination of these two groups it is suggested to assign, by way of example, plus potential to the first group and minus potential to the second group for the purpose of charging the storing condensers. Five condensers are used for discriminating within a group of five, but only four condensers, i. e. condenser GB1—CE1, can be charged and therewith have, in comparison to the first condenser CA1, a reference charge which is led over a testing means. The dividing into two groups of five has the advantage, that the same storing elements (five condensers) can be used twice and may be connected in both cases via the same testing means.

The identification of the digits depressed on the key set is represented by the charged or non-charged condition of five condensers, whereby for the first five digits, the first condenser obtains no charge from the remaining ones each time one or (at number 5) none obtains a charge. This arrangement offers the possibility of five combinations and, therewith, the identification of five digits. If the same arrangement is employed by reversing the conditions "charged" and "not charged," another five combinations will be obtained. Hence the assembly of the two groups of five results in ten different combinations for the identification of ten different digits.

The function of this circuit arrangement will be particularly described in the following with reference to the accompanying drawing:

If, for instance, key $T_1$ is depressed, then plus potential approaches relay T (lower left corner of drawing), which is assigned to all keys in common. This relay T, thereby, is energized and connects the five registering condensers of the first switching step (CA1 . . . CE1) to the keys by means of *t4* . . . *t8*, via the five wipers *sa* . . . *se*. If key T1 is in a depressed state, CB1 obtains a charge, whilst all other condensers are being discharged. Furthermore relay T, together with *t1*, energizes relay S which, by its two-way contact *s1*, de-energizes relay T by way of a short-circuit in a delayed manner.

Via the make contacts *t2* and *s2* the magnet SM of the registering selector obtains a current impulse and said registering selector makes one step forward, thus connecting its five wipers *sa, sb, sc, sid, se* to the condensers (CA2 . . . CE2) of the following switching step. Furthermore relay A*n* has been energized by contact *t3*. This relay immediately makes a holding circuit over contact *an1*, after relay H is switched-in by contact *an2*, thus completing the holding circuit for relay A*n* by contact *h1*. Thereafter contact *h2* energizes relay W which, with its contact *w1* switches-in the slow-acting relay WI. Prior thereto relay W had just switched-in the magnet AM of the testing selector by its contact *w2*, whereupon the said testing selector makes one switching step after relay W has been switched-off by contact *wI1*. Relay J is energized by contact *wI2*, thereby procuring its own holding current via contact *j1* and switches-in the impulse limiting relay JH via contact *j2*. Contact *jh1* again interrupts the circuit for relay J, whereby, owing to the reversal of contact *j2*, JH also drops-off again. Relay J together with relay JH are both pulsing until, as may be seen later on, the circuit for relay J is interrupted by contact *p1*.

As has been mentioned already above, the testing selector A which in the normal position is always one step behind the registering selector S, has connected its five wipers *aa, ab, ac, ad* and *ae* to the five condensers CA1 to CE1 by the energization of its magnet AM. Now the evaluation of the charging of the condenser CB1, caused by depressing the key T1, will be performed via the wipers *aa–ae* of the testing selector A. The identification as to which one of the condensers was charged is carried out by consecutive connecting of a test relay P to the discharge circuits of the individual condensers. The connection of relay P is accomplished by a chain of relays I–V, which are controlled by relay WI with its contact *wI3* and the pulsing relay J with its contact *j3*.

The function of the chain of relays is as follows: At the first pulse the relay I is energized via ground, contact *j3*, via its winding I to battery. Contact $1^{I}$ prepares the circuit for relay X winding I, and contact $1^{II}$ prepares the circuit for relay II winding I. If contact *j3* is closed, then a short-circuit exists for relay X and, therewith, likewise for relay II. If contact *j3* opens after the first pulse, then relay X will be energized with winding I via ground, contacts *wI4*, $5^{I}$, winding I of relay X, contacts $4^{I}$—$1^{1}$, winding I of relay I to battery.

Relay I likewise holds itself in this circuit via its winding I. Contact $x^1$ changes-over the pulse contact *j3* from relay I onto the following relays of the chain. At the second pulse relay II is energized via ground, the contacts *j3*, $x^1$, winding II of relay X, contact $1^2$, winding I of relay II, contact $1^1$, winding I of relay I to battery. Relay I(I) holds itself in this circuit. Contact $2^1$ prepares the disconnection of relay I. After the termination of the second pulse, relay I drops off. The contacts $1^2$ and $2^2$ prepare the circuit for relay III, winding I. The relays II (II) and relay X (I) are held via contacts $wI^4$, $5^1$, via winding I of relay X, contacts $4^1$—$2^1$, winding II of relay II to battery. At the fifth pulse relay V is energized via the pulse contact *j3*, contact $x^1$, winding II of relay X, the chain of contacts $1^2$—$3^2$, winding I of relay V, contact $4^1$, winding II of relay IV to battery. Contact $5^1$ prepares the disconnection of relays IV and X. After the termination of the fifth pulse, relays X and IV drop off. Relay U will be energized via ground, the contacts $wI^4$, contact $5^1$, $x^2$, relay U to battery and holds itself with its own contact $u^3$. The pulses 6–10 are received by the chain of relays in the same manner as the pulses 1–5, with the only difference that after the tenth pulse relay X does not drop off, but instead holds itself, via its winding III with contact $x^3$. Therewith also relay V holds itself via its winding II via the contacts $wI^4$, $5^1$, $x^2$. If contact $wI^4$ opens, then the chain of relays, including the relays U and X, is restored to normal. Relays I–V each are shortly energized consecutively at each impulse of relay J. By energizing relay I, the previously charged condenser CB1 will be connected by contact $1_1$, via wiper *ab* of the testing selector A, the contacts $1_1$, $2_1$, $3_1$, $4_1$, $5_1$, $u_1$, via relay P(I) and the rectifier GL, contact *u*2, via the wiper *aa* of the testing selector A, to the condenser CA1. Condenser CB1 had been charged with a negative potential, whereas condenser CA1 had been short-circuited to ground by means of a short-circuit via wiper *sa* of the recording selector and contacts *t*4 and *m*2 and, therefore, had not been charged. A discharge of the condenser CB1 therefore takes place via relay P, which, thereby, is switched in and interrupts the circuit for relay J at contact *p*1. Accordingly, relay J has only produced one impulse and has given with its contact *j*4, correspondingly to the depression of key T1, a current impulse on to the pulsing circuit. Relay P makes a holding circuit of its own by contact *p*4 and the winding P(II) until the next train of impulses appears (dropping of WI).

By depressing key T2 of the key set, condenser CC1 will be charged, by depressing key T3, condenser CD1 will be charged in the same manner, and when depressing key T4, condenser CE1 will be charged correspondingly. If key 5 is being depressed, however, no condenser charge takes place at all. Relay P is energized in this case at the charge of condenser CA1 via a minus potential applied by contacts $5^1$ and *u*4.

Accordingly with the aid of the relay chain I–V, an identification of the condenser chargings takes place each time, corresponding to the depressed key, and subsequently to the setting of the testing selector A, and this identification takes place in the following combinations:

Key T1: Relay P pulls-up via condenser CA and CB
Key T2: Relay P pulls-up via condenser CA and CC
Key T3: Relay P pulls-up via condenser CA and CD
Key T4: Relay P pulls-up via condenser CA and CE
Key T5: Relay P pulls-up via condenser CA and $5^1$ and *u*4.

When depressing the keys T6–T0, a change-over relay M will be energized before the pulling-up of the relays T and S, and which first of all, with its contact *m*1, completes the circuit for the said relays T and S. With the contacts *m*2–*m*6 a reversing takes place of the potential for the charging circuits of the storing condensers CA1–CE1. For test relay P, serving the identification of the condenser chargings, a polarity reversal likewise takes place by means of contacts *u*1 and *u*2, after relay U in the counting chain was energized at the end of the fifth impulse by the dropping-out of relay X and held with contact *u*3 controlled by *w*I4. Accordingly, the condenser charging will be performed in reversed current direction in respect to the numbers 6–0, and at a testing with the aid of relay P the impulse sending will only be interrupted from the sixth to the tenth impulse.

A diagram illustrating the connections of the relay P and the rectifier for the different keys depressed and the polarity of the charges of the C condensers is shown in the upper right corner of the figure.

The starting to a new series of impulses is controlled by relay H. This relay will be short-circuited when the wiper *af* of the testing selector A is one step behind the wiper *sf* of the registering selector S and if relay P has been energized. The energization of relay P is a circuit condition for the termination of the testing process. Only if the registering selectors, when receiving a further number, switches to the next step, will the short-circuit for relay H be interrupted, so that it will pull-up again and continue the impulse sending in the alternating manner between relay J and JH until relay P switches off.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A circuit arrangement for telecommunication systems for the registering and sending of control signals for selecting stages comprising a plurality of keys each representing a different value and arranged in first and second groups, according to the values they represent, a plurality of condensers, there being a lesser number than said keys, means for charging a combination of said condensers with one polarity when one of the keys in the first group is depressed, means for charging a combination of said condensers with the opposite polarity when one of the keys in the second group is depressed, counting means adapted for successive operation to produce a succession of signal pulses, means responsive to the operation of any key for initiating the operation of said counting means, test means including a unidirectional current-carrying device for testing said condensers, said device being polarized so as to permit current to flow through said device from a condenser when said test means is connected to said condenser and said condenser is charged with said one polarity, connecting means controlled by said counting means for connecting said test means successively to said condensers in repetitive cycles as long as said counting device continues to operate, means responsive to a predetermined number of operations of said counting means for reversing the polarity of said current-carrying device, and stop means connected to said counting means and to said test means for stopping the operation of said counting means when current flows through said test means.

2. A circuit arrangement according to claim 1 in which there are the same number of keys in each group and there are the same number of condensers as there are keys in a group, said condensers comprising a first condenser and a plurality of other condensers, and in which the means for charging a combination of said condensers with one polarity when one of the keys of the first group is depressed comprises means for charging a particular one of said other condensers and discharging said first condenser and the remainder of the other condensers when any key except the last key of the first group is depressed, and the means for charging a combination of said condensers with the opposite polarity when one of the keys of the second group is depressed comprises means for discharging a particular one of said other condensers and charging said first condenser and the remainder of said other condensers with the opposite polarity when any key of the second group except the last key is depressed, and in which the connecting means controlled by the connecting means for connecting the test means successively to said condensers in repetitive cycles comprises means for connecting said first condenser in series with said test means and successive ones of said other condensers, a source of potential, and means for connecting the test means in series with said first condenser and said source of potential when said counting means operates again after said test means has been connected to the last of said other condensers.

3. A circuit arrangement for telecommunication systems for the registering and sending of control signals for selecting stages comprising a plurality of keys arranged in first and second equal groups, according to the values they represent a plurality of condensers equal in number to the number of keys in a group, means connected to said first group of keys and to said condensers for charging a particular condenser with a first polarity and discharging all of the other condensers when any key, except the last of said first group, is depressed and for discharging all said condensers when said last key is depressed, counting means adapted to produce a succession of pulses when said counting means is energized, means connected to said keys for energizing said counting means when any key is depressed, test means connected to said counting means and controlled thereby for successively testing said condensers as said counting means operates, means in said test means and including unidirectional current-carrying means for stopping said counting means when a condenser charged with said first polarity is tested and when all of said condensers have been tested and none has been found charged, means connected to said second group of keys and to said condensers for charging all of said condensers with a second polarity except a particular one of said condensers when any key of said second group except the last is depressed and for charging all of said condensers with said second polarity when said last key of said second group is depressed, and means responsive to the operation of said counting means when it has produced a succession of pulses corresponding to the number of keys in said first group for causing said test means successively to test said condensers a second time and for reversing the polarity of said unidirectional current-carrying means, whereby said stopping means can respond when a condenser having no charge therein is tested or when all of said condensers have been tested and none has been found without a charge therein.

References Cited in the file of this patent

UNITED STATES PATENTS

| | | |
|---|---|---|
| 2,333,195 | Pouliart | Nov. 2, 1943 |
| 2,475,553 | McCready | July 5, 1949 |